United States Patent [19]

Pierce, Jr.

[11] 4,410,186

[45] Oct. 18, 1983

[54] SEALING SYSTEM FOR PRESSURIZED FLANGED JOINTS

[75] Inventor: Elwood K. Pierce, Jr., Coldspring, Tex.

[73] Assignee: Petroleum Designers, Inc., Houston, Tex.

[21] Appl. No.: 367,166

[22] Filed: Apr. 12, 1982

[51] Int. Cl.³ .................... F16J 15/06; F16J 15/40
[52] U.S. Cl. ................................ 277/2; 277/75; 277/167.5
[58] Field of Search ............... 277/2, 3, 75, 180, 206, 277/167.5, 190, 236

[56] References Cited

U.S. PATENT DOCUMENTS

| | | | |
|---|---|---|---|
| 580,049 | 4/1897 | Heim et al. | 277/2 |
| 3,030,118 | 4/1962 | Groce | 277/206 |
| 3,083,023 | 3/1963 | Creavey | 277/180 |
| 3,290,047 | 12/1966 | Mayer | 277/2 |
| 3,329,447 | 7/1967 | Hitz | 277/167.5 |
| 3,479,063 | 11/1969 | Rauer | 277/167.5 |
| 4,087,097 | 5/1978 | Bossens | 277/3 |
| 4,193,604 | 3/1980 | Sarvanne | 277/190 |
| 4,335,883 | 6/1982 | Le Roux | 277/2 |

FOREIGN PATENT DOCUMENTS 1275609 10/1961 France .................... 277/2

OTHER PUBLICATIONS

D/498 USA S. E. Beall and J. A. Swartout, vol. III p. 278.

*Primary Examiner*—Robert I. Smith
*Attorney, Agent, or Firm*—Gunn, Lee & Jackson

[57] ABSTRACT

A sealing system for pressurized flanged joints such as for use in flow line systems, wellhead assemblies, vessel joints, etc. The flanges of the pressure containing system are formed to define circular seal grooves having oppositely tapered circular side walls. Ring seal means is provided having a cross-sectional configuration that tapers from a large dimension intermediate the axially extremities to smaller dimensions at each of the axial extremities, thus defining tapered seal surfaces for sealing engagement with respective side walls of the seal grooves. The ring seals may define a passage means communicating the axial extremities and may also define yieldable resilient sealing lips thus enabling radial yielding of the sealing lips as the tapered side walls of the seal grooves are urged into sealing engagement with the seal ring. The sealing lips of flexible nature may be defined by the ring seal at the axial extremities or at either of the inner and outer peripheries of the ring seal. The flexible sealing lips are deflected radially as the ring seal is urged into the seal grooves and maintains sealing engagement with the side walls of the seal grooves in the event of slight flange separation or groove enlargement by metal coining. The joint sealing system incorporates detection means in communication with at least one of the seal grooves for detecting pressure changes that indicate seal leakage. The system also incorporates sealant injection means for injecting sealant into the seal grooves to form an auxiliary backup seal in the event leakage is detected.

21 Claims, 14 Drawing Figures

SEALING SYSTEM FOR PRESSURIZED FLANGED JOINTS

BACKGROUND OF THE INVENTION

1. Field of the Invention

This invention relates generally to the sealing of flanged joints wherein ring seals are received within mating circular grooves to establish a fluid type seal between the flanges of a pressure containing system such as a piping system, a wellhead assembly, a pressurized vessel, etc. More particularly, the present invention concerns a system for sealing flanged joints and for detecting and maintaining the seal integrity thereof and provides means for monitoring the seal integrity of the joint seals and for pressure testing the joint seals prior to internal pressurization of the pipeline, wellhead, etc.

2. Description of the Prior Art

Figure 2:
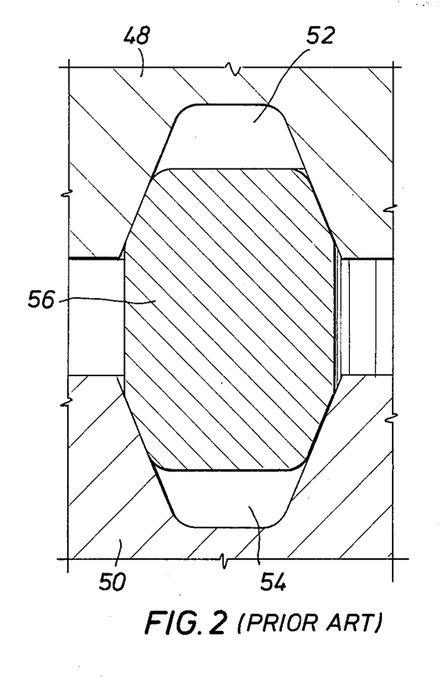
FIG. 2 is a fragmentary sectional view of a conventional joint seal representing the prior art with an API-type seal ring in sealed engagement with tapered wall surfaces of seal grooves.
Figure 3:
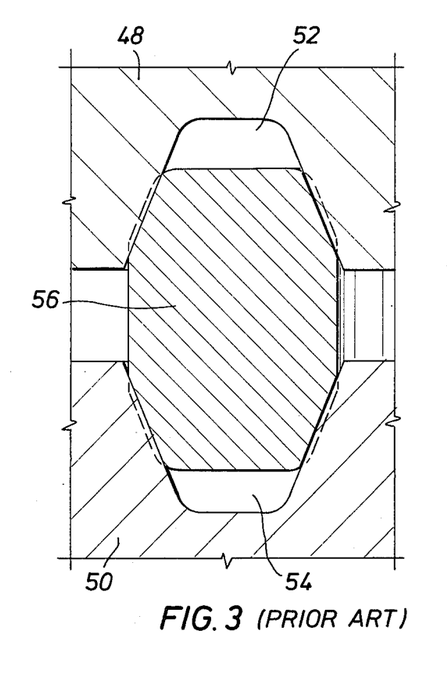
FIG. 3 is a fragmentary sectional view representing the prior art and illustrating coining of flange metal by means of force which is induced as the flanges are drawn into tight engagement with the seal ring.

Many types of internally pressurized fluid handling systems such as pipelines, wellheads, pressure vessels and the like, are composed of structural sections having flanges at opposite extremities thereof which are secured in assembly by means of bolts that extend through the flanges. In order to establish sealing between the flanges, a circular sealing element is typically provided which is tapered at each extremity and which is received within opposed annular seal grooves formed in the flanges which have tapered side walls that are engaged by the tapered portions of the ring seal in order to establish sealing. FIGS. 2 and 3 of the drawings hereof identify standard ring seals which are commonly referred to as API ring seals. When properly installed, the opposed flanges are positioned in spaced relation and are drawn together about the metal ring seal with sufficient force to cause metal-to-metal sealing between the tapered surfaces of the ring seal and the tapered surfaces of the opposed seal grooves. As shown in FIG. 2, the sealing surfaces of the ring seal are merely in engagement with the tapered side walls of the seal grooves. As shown in FIG. 3, the flanges have been drawn together by means of bolts or clamps with sufficient force to cause the ring seal to induce metal deformation or coining of the side walls of the seal grooves and seal ring. Coining of the side walls of the ring typically occurs because the metal of the ring seals is typically of less hardness as compared to the metal structure defining the flanges.

It is well known in the industry that API ring seals can leak upon the occurrence of certain physical phenomena. Under circumstances where bolts are tightened to secure the flanges in sealed assembly, excessive heat or excessive pressure can cause sufficient bolt extension that the flanges are enabled to be moved part to a slight degree. When this occurs, there may be insufficient mechanical force between the ring seal and the corresponding side wall surfaces of the seal grooves to maintain a positive fluid tight seal. In this case, leakage will develop at the flanged joint. Under circumstances where flanged joints are made up to a very tight degree, metal coining will occur in a manner set forth in FIG. 3. After metal coining only slight movement of the flanges need occur before seal leakage will develop.

In some cases it may be desirable to separate a flanged joint having a ring seal of the nature set forth in FIGS. 2 and 3. Should this occur and a different seal ring be employed when the flanges are again brought into assembly, previous coining or scratching of the side wall surfaces of the seal grooves may prevent effective sealing by the replacement seal ring. It is desirable therefore to provide a ring seal having the general character of an API ring seal and which is capable of maintaining its sealed integrity under circumstances where slight flange movement occurs. It is also desirable to provide an API-type ring seal that may be effectively reused under circumstances where a flanged joint has been disassembled and is then reassembled. It is especially desirable to provide a ring seal which is capable of replacing a standard API ring seal and which contacts groove surface area for sealing which has not been contacted by the standard API ring seal. It is desirable also to provide a ring seal having the capability of self energized sealing due to differential taper in comparison to the taper of the seal grooves.

When API-type flanged joints are made up, typically the only way to test the sealing integrity thereof is to fully assemble the pressurized apparatus and then apply internal pressure up to a particular test level. If no leakage occurs, the assembled apparatus may then be placed in service. On the other hand, if leakage is detected, the leaking joint must be disassembled and then reassembled, after which pressure testing is again accomplished to determine seal integrity. Frequently, leakage of a single flanged joint may require complete disassembly of the joined apparatus in order that the leaking flange may be disassembled and then properly reassembled. In some cases, when leakage of a flanged joint is detected, operating personnel merely apply more force to the bolts or clamps of the flanged joint, thereby forcing the flanges into tighter engagement with the ring seal. This activity frequently causes excessive coining of the metal of the seal ring and flanges. If adequate sealing is not developed in this manner, the excessive coining that occurs during overstressing of the metal may require replacement of the ring seals, remachining of the seal grooves or replacement of the flanges. Assembly and pressure testing in this manner is an expensive and time-consuming procedure and can cause significant loss of production thereby adding to the detrimental effect of the installation or repair procedure involved. It is desirable therefore to provide means for testing the sealed integrity of a flanged joint prior to internal pressurization of the pressure containing system.

Especially under circumstances where flanged joints become excessively heated, such as in the case of a fire, the bolts securing the flange in assembly can yield significantly to allow the development of seal leakage. Should seal leakage be detected, it is desirable to provide means for introducing supplementary or backup sealing, either selectively or automatically, to thus maintain or reestablish the seal integrity of the joint. It is also desirable to provide an API type ring seal having the capability of being pressure energized to enhance the sealing capability thereof.

SUMMARY OF THE INVENTION

It is a primary feature of the present invention to provide a novel sealing system for pressurized flanged joints incorporating metal ring seals having flexible metal sealing portions which are radially flexed upon assembly and which compensate for reasonable flange movement to maintain the sealed integrity of the flanged joint.

It is a further feature of the present invention to provide a novel sealing system for pressurized flanged joints which enables detection of the seal integrity of a flanged joint without requiring internal pressurization of the apparatus.

It is an even further feature of this invention to provide a novel sealing system for pressurized flanged joints wherein the sealing integrity between a metal seal ring and each of the flanges in abutting sealed assembly therewith may be simultaneously detected.

Another feature of this invention concerns the provision of a ring seal having a capability of engaging different surface areas of the seal grooves as compared to standard API ring seals, thus permitting efficient replacement of standard API ring seals to accomplish seal integrity even under circumstances where the seal grooves have been coined.

Among the several features of this invention is contemplated the provision of a novel sealing system for pressurized flanged joints wherein the ring seal element of the flanged joint is formed to define passage means interconnecting the axial extremities thereof, thereby permitting the opposed seal grooves of the flanges to be in fluid communication.

It is an even further feature of this invention to provide a novel sealing system for pressurized flange joints wherein pressure detection and sealant injection means is provided to detect any leakage of the flanged joint and upon such detection to inject supplemental sealant material into one or both of the seal grooves to maintain or reestablish the sealed integrity of the flanged joint.

It is also a feature of this invention to provide a novel sealing system for pressurized flanged joints wherein effective sealing capability is readily established between a metal seal ring and opposed seal grooves of joined flanges without inducing excessive coining of either the seals or seal grooves.

It is another feature of this invention to provide a ring seal having the capability of sealing against seal groove surfaces that are not engaged by standard API ring seals.

It is also a feature of this invention to provide a ring seal having the capability of being pressure energized to enhance the sealing capability thereof.

Briefly, the present invention relates to a sealing system for pressurized flanged joints which are secured in assembly by means of bolts, clamps or any other suitable means. The system incorporates circular ring seals of the general configuration of conventional API ring seals and which are adapted to be received within opposed seal grooves in the flanges which are formed in accordance with API standards. The seal grooves of the flanges are of circular form and define diverging tapered side walls which intersect a circular bottom wall. The ring seals are of circular form and define a cross-sectional configuration having a large intermediate dimension and tapered axial extremities which taper from the intermediate dimension to smaller dimensions at the respective axial extremities. The ring seals may be of the same metal composition as that of the flanges to provide similar coefficient of expansion as temperature changes occur but typically are composed of a metal which is softer than the metal of the flanges.

API-type ring seals are typically formed of metal such as steel having a hardness that is less than the hardness of the metal within which the seal grooves are formed. Conventional API ring seals therefore yield and become coined to a greater extent than the seal grooves within which they are received. Upon application of sufficient force to the opposed flanges such as by tightening the bolts, forces may be developed that will cause structural yielding or coining of the metal from which the flanges are composed, especially in the case of 10,000 PSI and 15,000 PSI flanges. In many cases, flanged joints are overtightened and develop excessive coining in this manner simply because the personnel involved have no way of determining the magnitude of sealing forces that are developed as the flanges are forcibly drawn together. Over-tightening of the flange bolts causes stresses in the flanges and causes the bolts as well as seals to reach the yield point of the respective materials, which is well above the design stress. On 10,000 and 15,000 PSI API flanges the raised face on the flange could be deleted because the seal ring would not require the outsides of the flanges to be bent or yielded together in order to achieve sufficient tightness to keep standard API rings from leaking. In accordance with the present invention, the ring seals have a cross-sectional configuration closely approximating that of conventional API ring seals. Portions of the ring seals of this invention, however, are radially yieldable toward one another by the seal groove surfaces thus allowing the sealing portions thereof to become flexed as the flanges are forced by the bolts or clamps into sealing engagement with the ring seal.

In accordance with one form of the invention, ring seals are provided having opposed circular sealing lips at each axial extremity thereof which define a circular groove therebetween. The taper of the circular sealing lips differs from the taper of the side surfaces of the seal grooves, thereby allowing the sealing lips to make initial contact before contact with the body portion of the seal is established. As the flanges are drawn into assembly the circular sealing lips of the seal ring become radially flexed toward one another by a camming activity that is developed between the sealing lips and the tapered side walls of the seal grooves. Yielding of the sealing lips, however, is accomplished within the elastic memory of the steel or other metal from which the ring seal is composed. In the event the flanges of the flanged joint move apart slightly, such as might be caused by an increase of internal pressure, heat induced lengthening of the bolts, etc., the circular sealing lips of the ring seal will move radially outwardly due to the inherent flexible spring-like nature thereof, thereby maintaining sealing engagement with the tapered side surfaces of the seal grooves. Upon slight separation of the flanges therefore there will be no tendency for the flanged joint to leak. The improved ring seals provide sealing contact closer to the bottom surface of the API seal grooves as compared to conventional API ring seals and thus provide effective sealing even under circumstances where the seal grooves have been coined by standard ring seals. If a standard ring sealed joint should leak because of excessive coining the API ring seal may be replaced with the improved ring seal hereof which will seal efficiently because it engages the uncoined portions of the seal groove surfaces.

In another form of the invention, a ring seal is provided having circular sealing lips at the axial extremities thereof defining a circular groove therebetween as described above. Additionally, the seal rings are formed to define one or more passages that intersect the circular grooves. When in assembly with the seal grooves of the opposed flanges, annular chambers will be developed between the bottom wall of the seal grooves and the axial extremities of the ring seals. These annular chambers will be communicated by means of the passage or passages of the seal rings which intersect the grooves defined between the yieldable sealing lips. By then forming pressure detection passages and sealant injection passages in the flanges, with these passages being in communication with the annular chambers, a determination can be made whether any leakage is occurring between the seal ring and either of the flanges. In the event leakage is detected, backup sealant material may then be injected into the annular chambers, thus providing a backup sealing capability to maintain an effective seal until the flanges can be adjusted or repaired as necessary to reestablish the sealed integrity thereof. In the event the apparatus is subjected to extreme heat such as during a fire, it is possible for the bolts to become elongated sufficiently that the flanges can move apart sufficiently to allow leakage at a sealed joint. Should this occur, with pressure detection equipment in communication with the sealed joint any leakage would be detected immediately. Upon detection of leakage, automatic sealant injection equipment is energized thus automatically injecting backup sealant material into the leaking joint. The backup sealant material seals the joint, thereby preventing further leakage of materials which might otherwise feed the fire. The sealant injection feature would also allow maintenance of the sealed integrity of a pressurized jointed assembly such as a pipeline or wellhead system for an extended period of time even under conditions of extreme heat. The apparatus of this invention therefore provides a fire safety capability. The flanges may also be provided with pressure test passages communicated with these annular chambers, thereby permitting the chambers to be pressurized after the seal rings have been properly installed. By pressurizing these annular chambers, seal leakage will be indicated if any pressure decrease is detected. This feature enables the sealed joint to be pressure tested immediately upon assembly thus insuring that the sealed joint will be properly sealed when the interior of the pressure containing joint sealed structure is pressurized. This feature provides an efficient labor saving feature during assembly of pressure containing jointed structures such as wellheads. If a joint does not test successfully it may be immediately disassembled, inspected and reassembled. The entire jointed apparatus need not be disassembled after internal pressure test.

In another form of the invention, a sealing element may have a C-shaped cross sectional configuration defining a circular undercut groove that is open to the pressure of the joint sealed system. The undercut groove is defined by a pair of opposed flexible sealing lips which define tapered circular sealing surfaces at the inner or outer peripheral portion of the seal ring. When this annular groove is defined at the inner periphery of the seal ring and pressure enters the groove, the flexible annular sealing lips become responsive to pressure as well as having an inherent resiliency which maintains sealing contact even under circumstances of flange separation. The general configuration of a joint seal element of this nature is such that it is receivable within a conventional API-type seal groove.

Other and further objects, advantages and features of the present invention will become apparent to one skilled in the art upon consideration of this entire disclosure including this specification and the annexed drawings. The form of the invention, which will now be described in detail, illustrates the general principles of this invention but it is to be understood that this detailed description is not to be taken as limiting the scope of the present invention.

BRIEF DESCRIPTION OF THE DRAWINGS

So that manner in which the above recited features, advantages and objects of the present invention are attained and can be understood in detail, more particular description of the invention briefly summarized above may be had by reference to the embodiments thereof which are illustrated in the appended drawings, which drawings form a part of this specification.

It is to be noted however that the appended drawings illustrate only typical embodiments of this invention and are therefore not be considered limiting of its scope, for the invention may admit to other equally effective embodiments. Referring now to the accompanying drawings, which are for illustrative purposes only.

DETAILED DESCRIPTION OF PREFERRED EMBODIMENTS

Figure 1:
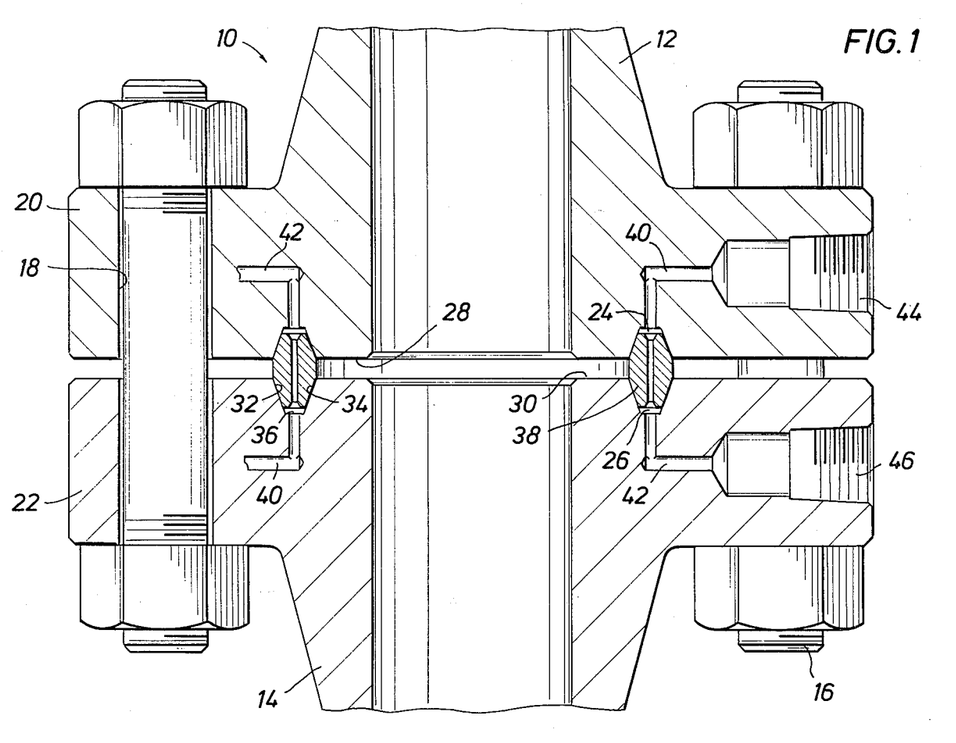
FIG. 1 is a sectional view of a flanged joint constructed in accordance with this invention and illustrating sealing of the joint by means of a seal ring that it also constructed in accordance with the principles of the invention.

Referring now to the drawings and first to FIG. 1, a flanged joint is depicted generally at 10 which includes flange elements 12 and 14 such as are typically provided to secure pressure containing structures in assembly. The flanges 12 and 14 may be of any character such as flanges connected to the extremities of pipe sections or the flanges of flanged wellhead sections, for example. The flanges 12 and 14 are maintained in sealed assembly by means of a plurality of nut and bolt assemblies 16 which extend through bolt holes 18 formed in the outer peripheral portions 20 and 22 of the flanges. Each of the flanges 12 and 14 is formed to define a circular seal groove such as shown at 24 and 26, the seal grooves being formed in the respective abutting faces 28 and 30 of the flanges. Each of the seal grooves is formed to define tapered side walls 32 and 34 which diverge outwardly from a bottom wall 36 thereof. When urged into proper assembly by the nut and bolt assemblies 16 the seal grooves 24 and 26 receive a circular ring seal element in such manner that the side walls 32 and 34 of each groove engage and establish sealing engagement with respective tapered portions of the ring seal. The ring seal element 38 and its respective sealed relation with the side wall surfaces 32 and 34 will be described in detail hereinbelow.

Each of the flanges 12 and 14 may be formed to define a pressure detection passage 40 and a sealant injection passage 42, being positioned approximately 180 degrees apart. The pressure detection passage and the sealant injection passage are each formed to intersect the bottom wall 36 of the respective seal groove and have outer portions 44 and 46, respectively, which are prepared in any suitable manner, such as by threading, to receive a conduit in fluid communication therewith. In the event of any leakage between the ring seal 38 and the tapered side walls of the respective seal grooves this leakage will be communicated into the respective pressure detection passage 40. Any leakage, no matter how small, may be efficiently detected by means of a seal monitoring system such as set forth in FIG. 14. Upon detection of any such leakage a sealant injection system, also incorporated within the apparatus of FIG. 14, may be employed to inject sealant material through the sealant injection passages 42 to thereby provide the ring seals with a backup sealing capability.

Referring now to FIGS. 2 and 3, a conventional API flanged joint is shown which represents the prior art. Opposed flanges 48 and 50 are formed to define seal grooves 52 and 54 having tapered side walls for sealing engagement with opposed tapered sealing surfaces of a conventional API ring seal 56. In FIG. 2 the ring seal 56 is shown in the original configuration thereof and in initial contact with the tapered sealing surfaces of the seal grooves 52 and 54. Conventional API ring seals are formed of metal having less hardness as compared to the hardness of the opposed flanges 48 and 50. When the flanges are brought into tight sealing engagement such as by tightening flange bolts, the metal of the ring seal will be deformed or coined from the broken line configuration thereof of FIG. 3 to the condition shown in full line. Under this condition, extremely tight metal-to-metal contact is established between the tapered sealing surfaces of the seal ring and the respective tapered sealing surfaces of the seal grooves. By forcing the flanges together about the seal the coining activity that takes place is typically accomplished by sufficiently great forces to permanently yield the metal structure of the ring seal. When the flanges are moved apart the ring seal, being permanently deformed, will not return to the original condition thereof as shown in FIG. 2. In most cases, the tapered sealing surfaces of the seal grooves are also coined or deformed to some extent by the magnitude of forces that are applied to establish sealing. One reason for this is that operating personnel usually have no way of determining the magnitude of forces that are necessary to accomplish sealing. Such personnel typically tighten the flange bolts as tight as possible thereby greatly exceeding the necessary forces for sealing. Under circumstances where the flanges form part of the assembly structure of drilling wellheads, the flanged joint is typically subjected to a significant amount of vibration during drilling operations. This vibration can loosen the flanges to such extent that leakage develops. In many cases, the vibration simply develops additional coining of the ring seal or ring seal grooves, thereby allowing leakage to occur. In this case it is simply necessary to tighten the flange joints sufficiently to eliminate any leakage that might have developed. The problems with conventional API-type ring seals such as shown in FIGS. 2 and 3 have promoted the development of the unique ring seals of the present invention.

Figure 4:
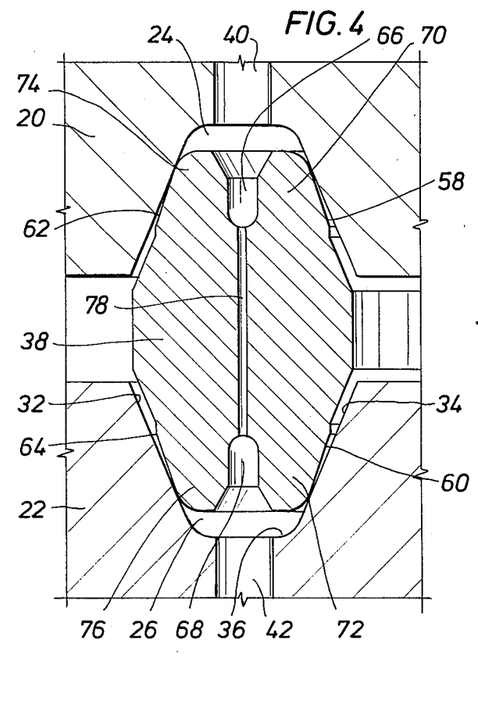
FIG. 4 is a fragmentary sectional view of the flanges of FIG. 1 illustrating positioning of the seal ring in touching engagement with the wall surfaces of the seal grooves and illustrating initial contact at a deeper position within the seal grooves as compared to standard API ring seals.
Figure 5:
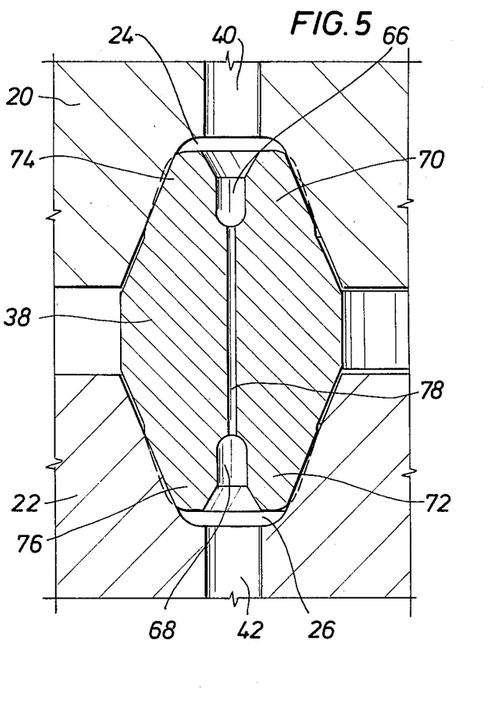
FIG. 5 is a fragmentary sectional view illustrating the condition of the sealing element of FIGS. 1 and 4 after the flanges have been drawn into proper sealing engagement with the seal ring.

Referring now to FIGS. 4 and 5, the ring seal structure of FIG. 1 is shown in detail with touching engagement shown in FIG. 4 and fully sealed engagement illustrated in FIG. 5. As shown at the lower portions of the figures, each of the seal grooves 24 and 26 is defined by circular tapered side walls 32 and 34 as mentioned above, which form frusto conical sealing surfaces. The seal groove is also defined by a circular bottom wall 36 which is intersected by a pressure detection passage means 40 and sealant injection passage means 42 as discussed above in connection with FIG. 1.

The circular ring seal element 38 is typically formed of metal that is of less hardness as compared to the hardness of the flanges 22 and 24. The circular ring seal 38 is also formed to define opposed pairs of internal sealing lands 58 and 60 and a pair of opposed external sealing lands 62 and 64. The circular internal and external seal lands define tapered or frusto conical sealing surfaces having a different taper as compared to the taper of the respective side wall sealing surfaces of the seal grooves. The tapered sealing lands establish initial line contact with the sealing surfaces of the seal grooves and, upon tightening of the flanges, become yielded to the extent that surface-to-surface sealing contact is established as shown in FIG. 5 without exceeding the elastic limits of the metal from which the ring seal is formed.

The axial end portions of the ring seal element 38 are formed to define circular grooves 66 and 68 thereby forming opposed circular sealing lips at the axial end portions of the seal. The circular grooves form the axial extremities of the ring seal into a pair of opposed inner peripheral sealing lips 70 and 72 and a pair of outer peripheral sealing lips 74 and 76. The inner and outer sealing lips are sufficiently resilient that they are yielded in radial manner as the flanges are moved to the sealing positions thereof as shown in FIG. 5. In FIG. 5 the original unyielded condition of the ring seal is shown by way of broken lines. As the flanges 20 and 22 are drawn together the tapered sealing surfaces 32 and 34 of the sealed grooves function in cam-like manner to urge the respective annular sealing lips toward one another. This radial yielding is within the elastic memory of the metal from which the ring seal 38 is composed. Should the flanges 20 and 22 have slight movement away from one another, such as upon loosening of the bolts, the circular sealing lips, due to the spring-like nature thereof, will simply move apart slightly thereby maintaining sealing engagement with the tapered sealing surfaces of the grooves. The ring seals of this invention will therefore maintain sealing engagement to prevent leakage under conditions of slight separation of the flanges.

It is desirable to monitor the seal integrity at the sealed flanged joints to thereby identify any seal leakage no matter how small. In accordance with the present invention the circular ring seal 38 is formed to define one or more leakage detection passages 78 which establish fluid communication between the opposed circular grooves 66 and 68. If leakage occurs between the ring seal and the inner peripheral sealing surfaces of the respective seal grooves the leaked fluid will enter the circular chambers 24 and 26 defined between the opposed extremities of the seal ring and the bottom walls 36 of the seal grooves. Leakage into either of these annular chambers is conducted by a leakage detection passage 78 to the opposite one of the circular grooves 66 and 68. In this manner the leaked fluid will then enter the leakage detection passage 40 thereby providing a pressure change at instrumentation interconnected with leakage detection passage 40. Monitoring equipment such as that shown in FIG. 14 will then provide operating personnel with an indication that seal leakage has occurred and will specifically identify the sealed joint where leakage has begun. Operating personnel will then have the capability of tightening the flanges to reestablish sealing capability or injecting backup sealant material through sealant injection passage 42 to thereby enhance the sealing capability of the ring seal. The backup sealant material may have a capability of entering the circular groove 68 of the ring seal 38, traversing the leakage detection passage 78 and entering the opposite circular groove 66 and filling chamber 24 with suitable sealant material.

Figure 6:
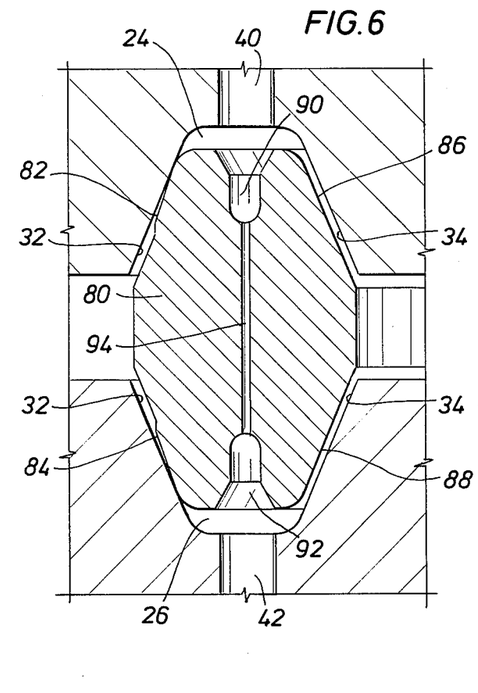
FIG. 6 is a fragmentary sectional view of a ring seal constructed in accordance with this invention and representing an alternative embodiment of the invention.
Figure 7:
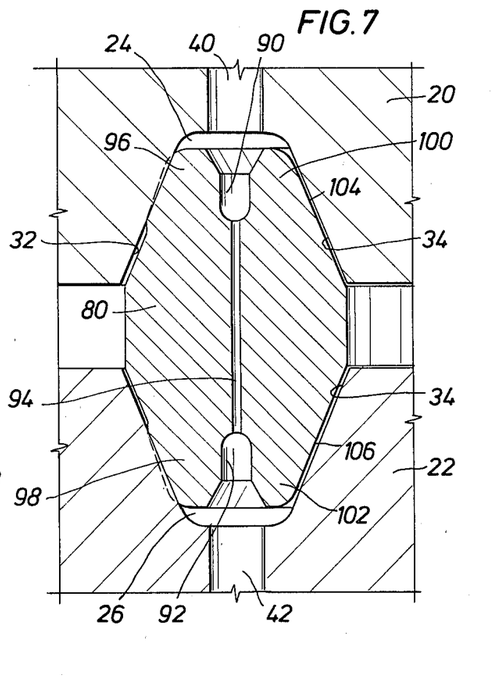
FIG. 7 is a fragmentary sectional view illustrating the seal ring of FIG. 6 being properly made up in sealed engagement with respect to the flanges and showing the effect of fluid pressure at the joint.

Referring now to FIGS. 6 and 7, a ring seal is shown at 80 which represents a modified embodiment of the present invention. The ring seal 80 is formed to define a pair of opposed tapered external sealing lands 82 and 84 of slightly differing taper as compared to the taper of the external tapered sealing surfaces 32 of the seal grooves 24 and 26. At its inner periphery the ring seal 80 is formed to define tapered surfaces 86 and 88 that are adapted to have a relation of standoff with the inner peripheral sealing surfaces 34 upon tightening of the flanged joint as shown in FIG. 7.

The ring seal 80 is also formed to define opposed circular grooves 90 and 92 at the axial extremities thereof which are interconnected by means of one or more pressure detection passages 94. The circular grooves 90 and 92 divide the axial extremities of the seal ring 80 into inner and outer circular portions. The outer circular portions define a pair of flexible circular sealing lips 96 and 98 which are yieldable in radial manner from the broken line position thereof to the full line position responsive to reaction with the tapered sealing surfaces of the seal grooves. This radial yielding is within the elastic limits of the material from which the seal ring is composed, thereby allowing the sealing lips 96 and 98 to maintain sealing contact with the seal surfaces 32 and 34 under circumstances where slight separation of the flanges should occur. The sealing lips 96 and 98 will return substantially to the original configuration thereof upon separation of the flanges to the FIG. 6 positions thereof. The circular grooves 90 and 92 also form circular lips 100 and 102 on opposite sides of the inner peripheral portion of the seal ring. The annular lips 100 and 102 are not sealing lips since they are not yielded in radial manner by a sealing surface of the groove. As shown in FIG. 7, the flanges 20 and 22 are shown in the fully assembled relation with respect to the circular ring seal. In this condition, there is standoff between the tapered outer surfaces 104 and 106 of the ring seal and the respective inner sealing surfaces 34 of the seal grooves. The pressure responsive surface area of the ring seal 80 is thereby determined from the points of sealing contact of the flexible seal lips 96 and 98 with the tapered sealing surfaces 32 and 34 of the seal grooves. The ring seal 80 is therefore pressure energized by fluid pressure entering the seal grooves by virtue of the standoff between the ring seal and the inner tapered surfaces of the seal grooves. In all other aspects the ring seal 80 functions in the same manner as discussed above in connection with FIGS. 4 and 5.

Figure 8:
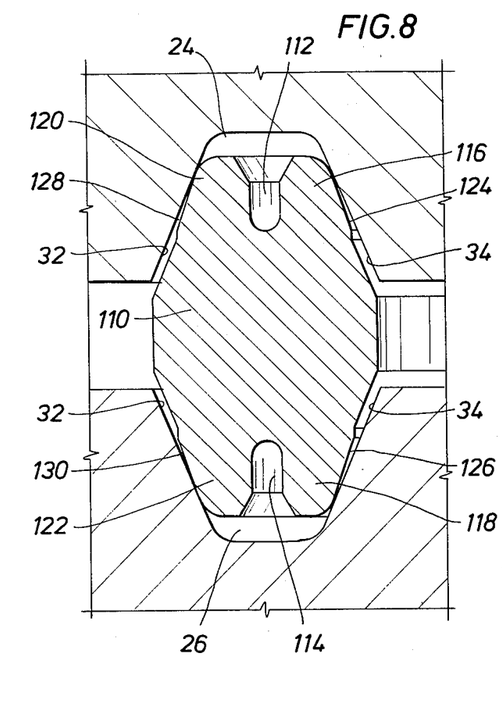
FIG. 8 is a fragmentary sectional view representing the seal grooves of a flanged joint within which is located a seal ring representing an even further embodiment of this invention, the seal ring being shown in touching engagement with the tapered sealing surfaces of the grooves.
Figure 9:
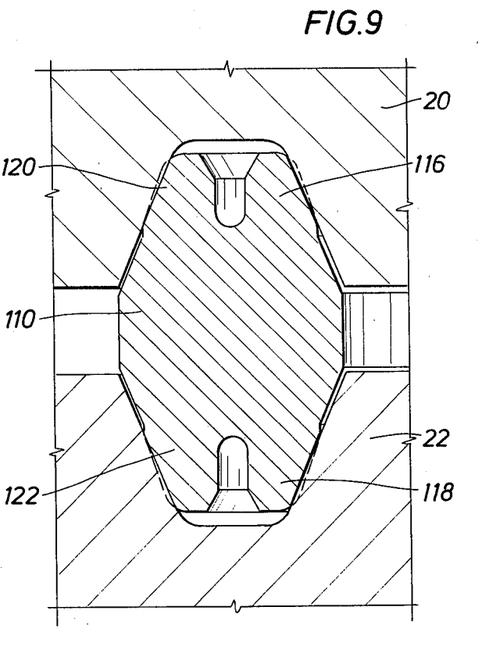
FIG. 9 is a fragmentary sectional view showing the joint seal ring of FIG. 8 when the flanges are drawn into tight sealing engagement with the seal ring.

Referring now to FIGS. 8 and 9, a ring seal representing a further embodiment of this invention is shown at 110. The ring seal 110 is structurally the same as the ring seal 38 of FIGS. 4 and 5 with the exception that the circular grooves 112 and 114 at the axial extremities thereof are not in fluid communication. As shown in FIG. 8, the ring seal 110 is in merely touching engagement with respect to the tapered sealing surfaces 32 and 34 of the respective seal grooves 24 and 26. The circular grooves 112 and 114 separate the axial extremities of the seal groove into opposed inner sealing lips 116 and 118 and opposed outer sealing lips 120 and 122. Both the inner and outer pairs of circular sealing lips define circular tapered sealing lands having a different taper as compared to the taper of the respective sealing surfaces 32 and 34 of the seal grooves. At the inner periphery of the ring seal 110 opposed inner sealing lands are shown at 124 and 126 while outer peripheral sealing lands 128 and 130 define the outer surface portions of the respective sealing lips 120 and 122. Both the inner and outer sealing lips are radially yieldable by the tapered seal surfaces 32 and 34 of the seal grooves as the flanges 20 and 22 are brought into tightly assembled relation with respect to the ring seal as shown in FIG. 9. Upon assembly the reaction forces developed between the sealing surfaces 32 and 34 of the seal grooves and the inner and outer pairs of sealing lands cause radial yielding of the seal lips from the broken line positions thereof to the full line positions shown in FIG. 9.

Figure 10:
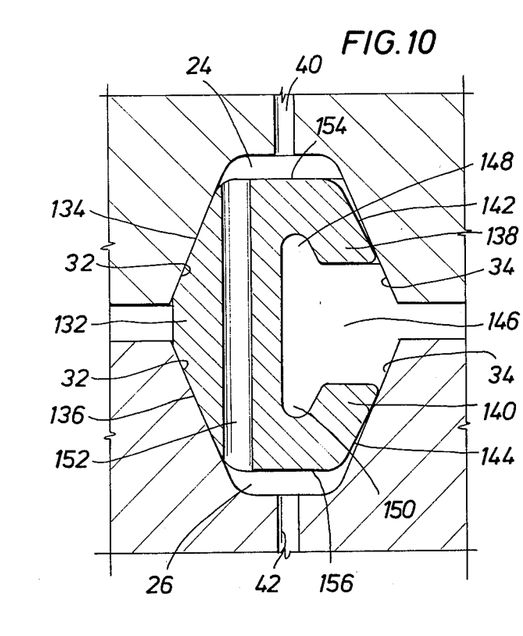
FIG. 10 is a fragmentary sectional view representing a flanged joint defining seal grooves within which is located a seal ring representing an even further embodiment of this invention.
Figure 11:
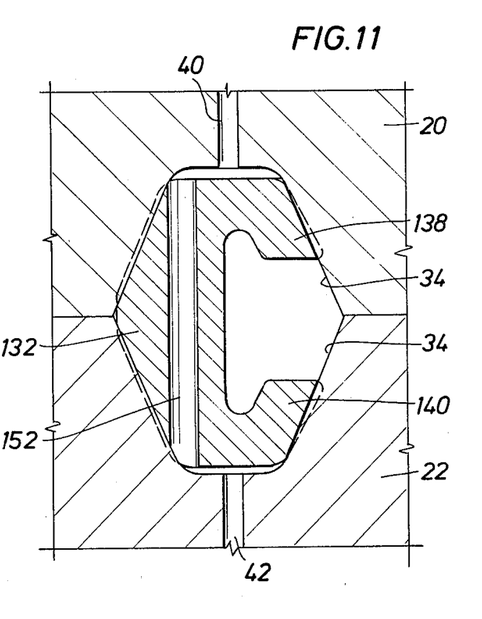
FIG. 11 is fragmentary sectional view of the seal ring of FIG. 10 showing the condition thereof when the joint is brought into sealed assembly with no flange standoff.

Referring now to FIGS. 10 and 11, a ring seal construction may be provided having an alternative form shown at 132. The ring seal 132 is adapted to be received within a conventional API-type seal groove such as shown at 24 and 26 and is adapted to be pressure energized by the fluid pressure contained by the seal joint. The ring seal 132 is of circular form defining tapered outer sealing surfaces 134 and 136 which are adapted for sealing engagement with the outer sealing surfaces 32 of the respective seal grooves 24 and 26. The ring seal 132 is also formed to define an opposed pair of flexible sealing lips 138 and 140 at the inner periphery thereof which define tapered sealing surfaces 142 and 144 respectively, having a taper that differs from the taper of the inner seal groove surfaces 34. The flexible sealing lips 138 and 140 are defined by an annular inner peripheral groove 146 having undercut groove portions 148 and 150.

To provide for detection of any leakage that might occur the ring seal 132 is formed to define a leakage detection passage 152 which terminates at each axial extremity 154 and 156 of the ring seal, thus communicating the inner portions of the seal grooves. Upon detection of any seal leakage by leakage detection equipment in communication with passage 40 backup sealing may be provided by injecting sealant material through sealant injection passage 42.

As shown in FIG. 11, the flanges 20 and 22 are shown to be assembled without standoff. As the flanges move into abutting relation such as by tightening of the flange bolts, the configuration of the ring seal 132 will be changed by reaction with the tapered groove surfaces 32 and 34 from the broken line condition to the full line condition shown in FIG. 11. The broken line condition of FIG. 11 is of course the full line configuration illustrated in FIG. 10. Fluid pressure will enter the inner peripheral groove 146 defined by the ring seal 132 thereby developing internal forces against the flexible sealing lips 138 tending to urge the sealing lips into tighter sealing engagement with the respective groove surfaces 34. The ring seal 132 is therefore pressure energized to enhance the sealing capability thereof. The ring seal is also composed of a metal having sufficient resilience that the flexible sealing lips 138 and 140 will maintain sealing engagement with the respective inner peripheral seal groove surfaces 34 even under circumstances where slight flange separation occurs.

Figure 12:
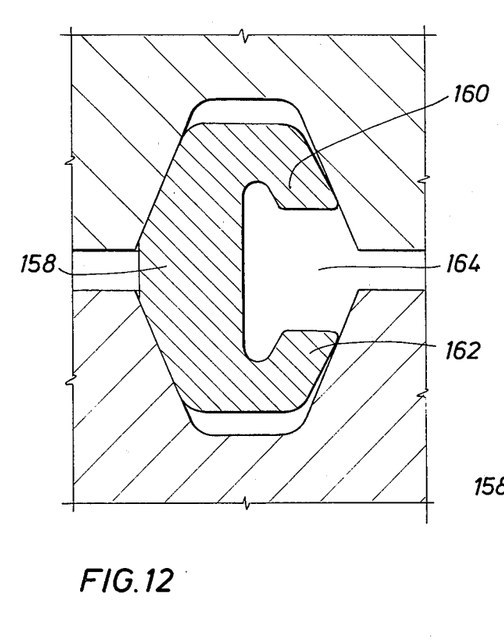
FIG. 12 is a fragmentary sectional view of a ring sealed joint representing another embodiment of this invention.
Figure 13:
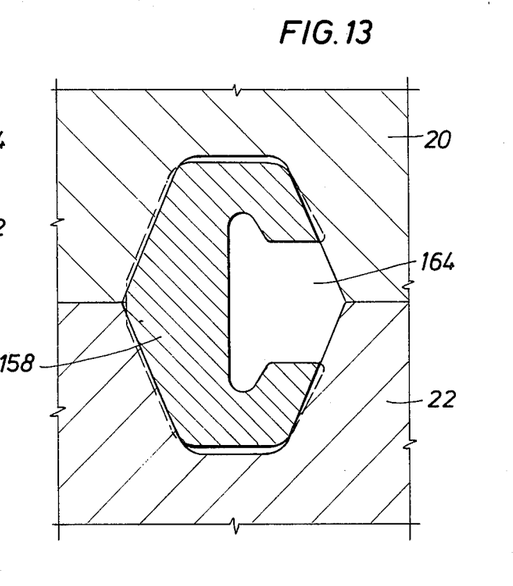
FIG. 13 is a fragmentary sectional view illustrating the ring seal of FIG. 12 when the flanges of the joint have been brought into abutting relation.

As shown in FIGS. 12 and 13, a ring seal structure is shown at 158 having the same basic configuration and function as compared to the ring seal 132 of FIGS. 10 and 11. Ring seal 158 however is not provided with a leakage detection passage 152 and therefore would not be utilized under circumstances where the seal grooves are communicated with leakage detection and sealant injection passages. The ring seal construction 158 defines opposed inner peripheral sealing lips 160 and 162 which are flexible and are yielded in radial manner as the flanges 20 and 22 are brought into abutting relation. The dimensional changes of the ring seal 158 are substantially the same as discussed above in connection with ring seal 132 of FIGS. 10 and 11.

Although the ring seals 132 and 158 are shown with the inner peripheral grooves thereof exposed to pressure, it is not intended to so limit such ring seal orientation. For example, as shown in FIGS. 10–13, the ring seals 132 and 158 may be formed in such manner that the central grooves 146 and 164 thereof are exposed at the outer peripheries of the respective ring seals. Under this circumstance the ring seals would not be pressure energized and the sealing capability thereof would be restricted solely to the metal-to-metal sealing that occurs as the flexible sealing lips are yielded in radial manner by the mechanical forces that are developed between the sealing lips and the respective inner or outer tapered sealing surfaces of the seal grooves.

Figure 14:
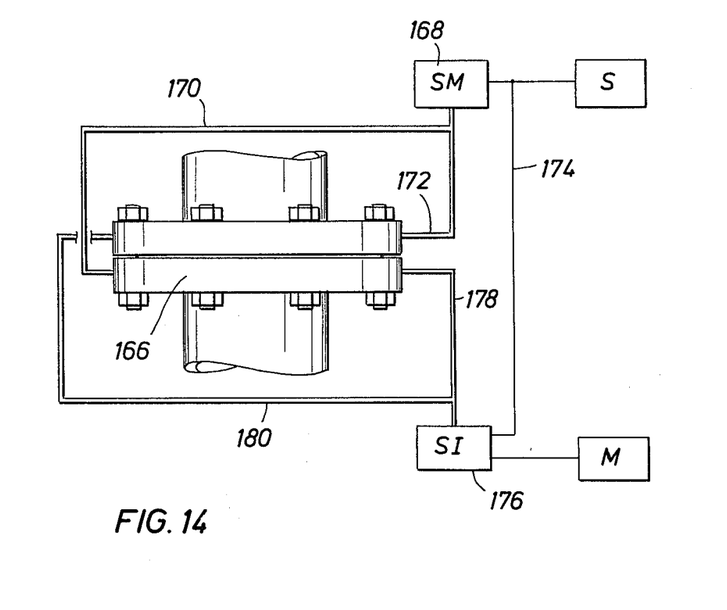
FIG. 14 is a partially pictorial and partially schematic representation of a seal monitoring and sealant injection system for providing ring sealed joints with back-up sealing in the event seal leakage is detected.

Referring now to FIG. 14, there is shown a partially structural and partially schematic system for detection of seal leakage and injection of sealant under circumstances where leakage is detected. As shown in the figure, a flanged joint 166 is illustrated having internal seal grooves which are constructed in accordance with FIG. 1 and with pressure detection passages and sealant injection passages provided in communication with the seal grooves as shown at 40 and 42 in FIG. 1. Seal monitoring means 168 is provided which is communicated by means of conduits 170 and 172 to the respective leakage detection passages 40 of the opposed flanges. Any leakage of the ring seals will develop pressure changes in either or both of the conduits 170 and 172. Such leakage may also develop a condition of flow in the conduits 170 or 172 regardless of the volume of the fluid leakage. The condition of pressure change or flow is detected by the seal monitoring module 168 which may automatically transmit an electrical signal via conductor 174 to a sealant injection module 176. The sealant injection module is communicated by conduits 178 and 180 with the respective sealant injection passages 42 of the opposed flanges. Upon detection of an appropriate signal via electrical conduit 174 the sealant injection module 176 will become activated automatically thereby introducing sealant through the conduits 178 and 180 into the sealant injection passages and seal grooves of the flanges. This causes automatic backup of the metal-to-metal sealing of the ring seals, thus causing cessation of leakage until such time as the flange bolts may be tightened and metal-to-metal sealing capability properly restored. The seal monitoring and sealant injection system of FIG. 14 is exemplary only of an automatic sealant injection system such as might be employed to accommodate the leakage that typically occurs under circumstances where the flanged joint is subjected to excessive heat. In the event of a fire, the bolts of a flanged joint will typically become lengthened, thereby allowing separation of the flanges resulting in leakage of the ring seals. Leakage, especially of a combustible material, could allow feeding of the fire. Through employment of an automatic seal monitoring and sealant injection system such as shown in FIG. 14, any leakage of fluid regardless of the circumstances would trigger automatic injection of backup sealant material into the flanged joint to enhance its sealing capability. This feature would logically provide a fire safety feature such as might be highly desirable in pipeline and wellhead assemblies for control of high pressure flammable fluid medium.

In view of the foregoing, it is respectfully submitted that the present invention is one well adapted to attain all of the objects and features hereinabove set forth, together with other features which are inherent in the apparatus itself. It will be understood that certain combinations and subcombinations are of utility and may be employed without reference to other features and subcombinations. This is contemplated by and is within the scope of the present invention.

What is claimed is:

1. A system for sealing flanged joints in flow line systems and for detecting and maintaining the seal integrity thereof, said system comprising:
(a) a pair of flanges each defining annular seal groove means having tapered circular side wall means, said flanges further defining pressure detection and sealant injection passage means in communication with said seal groove means;
(b) ring seal means being positioned within said seal grooves of said flanges and having tapered inner and outer sealing surface means for sealing engagement with said tapered side wall means of said seal groove means, the axial extremities of said ring seal means cooperating with said seal groove means to define pressure detection and sealant injection chamber means being in communication with respective ones of said pressure detection and sealant injection passage means of said flanges; and (c) pressure detection passage means communicating said pressure detection and sealant injection chamber means and facilitating simultaneous detection of any leakage past said ring seal means and into either of said pressure detection chamber means.

2. A system as recited in claim 1, wherein said pressure detection passage means extends through said ring seal means and terminates at the axial extremities thereof.

3. A system as recited in claim 1, wherein:
the axial extremities of said ring seal means is defined by concentric circular flexible sealing lips that are flexed radially as said flanges are urged into sealed assembly.

4. A system as recited in claim 1, wherein:
said tapered sealing surface means of said ring seal means is radially flexed upon assembly thereof within said seal groove means by reaction thereof with said tapered side wall means.

5. A system as recited in claim 1, wherein:
said ring seal means is of generally C-shaped cross-sectional configuration forming opposed yieldable resilient sealing lips which cooperate to define a circular groove intermediate the axial extremities thereof and which establish sealing engagement with said tapered circular side wall means of said seal groove means, said yieldable resilient sealing lips being both mechanically energized and pressure energized.

6. The system recited in claim 1, including:
(a) leakage monitoring means being in fluid communication with said annular seal groove means of said flanges and providing leakage signal means responsive to leakage past said ring seal means; and
(b) sealant injection means being in fluid communication with said annular seal groove means of said flanges, said sealant injection means being selectively responsive to said signal and manual signal means to inject backup sealant material into said annular seal groove means.

7. The system of claim 6, wherein:
(a) said leakage signal means is responsive to selected physical phenomenon detected by said signal monitoring means; and
(b) said sealant injection means is responsive automatically to said signal means and selectively to manually induced signal means.

8. A ring seal for establishing sealing between the flanges of pipe joints wherein said flanges define opposed circular seal grooves having tapered circular side walls, said ring seal comprising:
a circular metal ring seal element having a cross-sectional configuration defining a large intermediate dimension and tapering to smaller dimensions at each axial extremity thereof, said axial extremities of said ring seal element defining spaced circular sealing lips defining a circular groove therebetween, said sealing lips being flexible and flexing radially toward said circular groove upon forcible sealing contact between said sealing lips and said tapered circular side walls of said seal groove means.

9. A ring seal as recited in claim 8, wherein:
said sealing lips each define tapered sealing lands for sealing engagement with intermediate portions of said side walls of said seal grooves, said tapered sealing lands having a different angle of taper as compared to the angle of taper defined by said side walls of said seal grooves.

10. A ring seal as recited in claim 8, wherein:
said metal sealing element defines passage means communicating each of said circular grooves.

11. A ring seal as recited in claim 10, wherein:
said sealing lips define tapered sealing lands for sealing engagement with intermediate portions of said side walls of said seal grooves.

12. A ring seal as recited in claim 8, wherein:
(a) said sealing element defines inner peripheral circular sealing lips at each axial extremity thereof and outer peripheral circular sealing lips at each axial extremity thereof; and
(b) at least one of said inner and outer sealing lips defining raised circular tapered sealing lands for sealing engagement with respective tapered circular side walls of said seal groove.

13. A ring seal as recited in claim 12, wherein:
said sealing element defines passage means communicating the axial extremities thereof.

14. A ring seal as recited in claim 12, wherein:
(a) said inner peripheral sealing lips taper smoothly from said large intermediate dimension to said axial extremities of said sealing element; and
(b) said outer peripheral sealing lips define raised circular tapered sealing surfaces for sealing engagement with intermediate portions of said tapered side walls engaged thereby.

15. A ring seal as recited in claim 14, wherein:
said sealing element defines passage means communicating the axial extremities thereof.

16. A ring seal as defined in claim 8 wherein:
the axial extremities of said ring seal means are formed to define opposed inner and outer circular lip means forming a circular groove therebetween, at least one of said opposed inner and outer lip means being flexible and defining circular tapered sealing surface means for sealing engagement with at least one of the inner and outer tapered side wall means of said seal groove means, said flexible lip means being radially flexed by reaction being radially flexed by reaction thereof with said tapered side wall means upon movement of said flanges toward one another during assembly.

17. A ring seal for establishing sealing between the flanges of pipe joints wherein said flanges define circular seal grooves having tapered circular side walls, said ring seal comprising:
(a) a circular metal seal body defining oppositely tapered sealing surfaces at one of the inner and outer peripheries thereof, said sealing surfaces tapering from a large cross-sectional dimension intermediate the axial extremities of said seal body to a smaller cross-sectional dimension at said axial extremities; and
(b) a pair of opposed circular sealing lips being defined by the other of said inner and outer peripheries of said seal body, said sealing lips defining oppositely tapered circular sealing surfaces tapering from a large cross-sectional dimension at the intermediate portion of said seal body to a smaller dimension at said axial extremities, said sealing lips being flexible and yielding radially inwardly by said tapered circular side walls upon being forced into said circular seal grooves of said flanges.

18. A ring seal as recited in claim 17, wherein:

said metal seal body defines passage means intersecting said axial extremities thereof.

19. A ring seal as recited in claim 17 wherein:
said circular sealing lips each define tapered sealing lands having a different angle of taper as compared to the angle of taper of said circular side wall means of said seal grooves.

20. A ring seal as recited in claim 17, wherein:
said metal seal body and said sealing lips cooperate to define a circular undercut groove having a groove opening defined by said spaced sealing lips and located at one of said inner and outer peripheries of said ring seal.

21. A ring seal as recited in claim 20, wherein:
(a) said groove opening is located at the inner periphery of said ring seal and said undercut groove is adapted to be exposed to fluid pressure; and
(b) when sealed within said seal grooves, the inner portions of said sealing lips are exposed to pressure from said undercut groove causing pressure energization of the seal to be developed thereby.

* * * * *